United States Patent [19]

Demny et al.

[11] 3,859,171

[45] Jan. 7, 1975

[54] L-2-AMINO-4-METHOXY-TRANS-3-BUTENOIC ACID

[75] Inventors: Thomas Casimir Demny, Livingston; James Parnell Scannell, Bloomfield, both of N.J.

[73] Assignee: Hoffman-La Roche Inc., Nutley, N.J.

[22] Filed: May 7, 1973

[21] Appl. No.: 357,990

Related U.S. Application Data

[62] Division of Ser. No. 191,074, Oct. 20, 1971, Pat. No. 3,739,022.

[52] U.S. Cl. ................................ 195/96, 195/47
[51] Int. Cl. ............................................. C12k 1/00
[58] Field of Search ...................... 195/96, 80, 47

[56] References Cited
OTHER PUBLICATIONS

Tobie, J. Bact. 52 p. 685–686 (1946).
Chem. Abstracts 73: 44909g.

*Primary Examiner*—Lionel M. Shapiro
*Assistant Examiner*—Thomas G. Wiseman
*Attorney, Agent, or Firm*—Samuel L. Welt; Bernard S. Leon

[57] ABSTRACT

The present invention relates to the preparation of the antibacterial substance L-2-amino-4-methoxy-trans-3-butenoic acid by culturing the organism *Pseudomonas aeruginosa*.

1 Claim, No Drawings

L-2-AMINO-4-M ETHOXY-TRANS-3-BUTENOIC ACID

This is a division of application Ser. No. 191,074 filed Oct. 20, 1971, now U.S. Pat. No. 3,739,022.

DETAILED DESCRIPTION OF THE INVENTION

The present invention relates to a compound of the formula

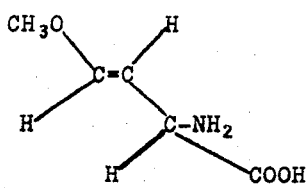

I and pharmaceutically acceptable cationic salts thereof.

The compound of the formula I is prepared by culturing a known microorganism *Pseudomonas aeruginosa* ATCC 7700 in a fermentation medium containing nutrient sources under submerged aerobic conditions, until activity against bacteria occurs and then isolating the so-obtained compound of the formula I from the fermentation broth.

The conditions of fermentation are generally the same as conventional methods for producing a substance by fermentation. The fermentation medium contains the usual nutrient and mineral sources supplying carbon, nitrogen, and energy to the developing culture. Suitable nutrients include, for example, carbohydrates such as, starch, dextrose, sucrose, glucose, molasses and nitrogen sources such as, soybean meal, yeast, meat extracts, corn steap liquor, distiller solubles, inorganic salts such as, calcium carbonate, ammonium sulfate, as well as trace elements. Suitably, the fermentation is permitted to proceed for from about 3 to 10 days.

The compound of the formula I can be isolated from the fermentation broth in which it is prepared by adsorption into an anion exchange column, followed by elution with any suitable eluent preferably trimethylammonium bicarbonate or any other equivalent volatile buffered medium. The isolation procedure can be illustrated diagrammatically as follows:

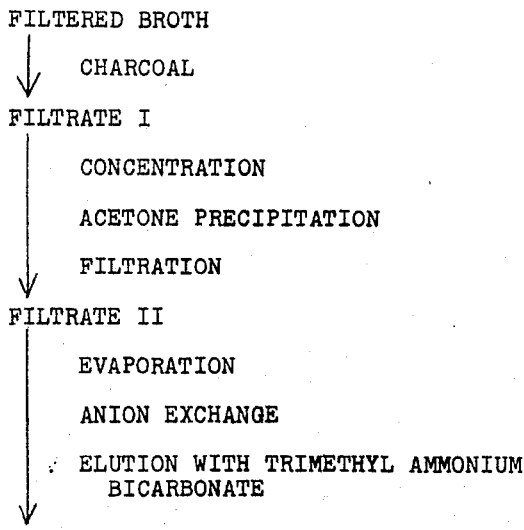

FILTERED BROTH
↓ CHARCOAL
FILTRATE I
↓ CONCENTRATION
↓ ACETONE PRECIPITATION
↓ FILTRATION
FILTRATE II
↓ EVAPORATION
↓ ANION EXCHANGE
↓ ELUTION WITH TRIMETHYL AMMONIUM BICARBONATE
↓ ELUATE
↓ CONCENTRATION
↓ CRYSTALLIZATION FROM METHANOL
COMPOUND OF THE FORMULA I

The compound of the formula I forms cationic salts with pharmaceutically acceptable bases, such as, sodium hydroxide, potassium hydroxide, calcium hydroxide whereby respectively sodium, potassium and calcium salts are obtained. Such addition salts, prepared by admixture of the compound of the formula I and base as the case may be, are equivalent for purposes of the present invention to each other and to the compound of the formula I in non-salt form.

The compounds of the formula I and their pharmaceutically acceptable cationic salts are useful as antibacterial agents and thus can combat gram-positive and gram-negative bacteria. They are also useful as antitrichomonal agents. They may be administered orally or parenterally, in conventional dosage forms with dosage adjusted to the individual needs of the one treated.

The compound of the formula I and its salts can be used in the form of conventional pharmaceutical preparations. For example, said compounds can be mixed with conventional organic and inorganic inert pharmaceutical carriers for parenteral or enteral administration such as, for example, water, gelatin, starch, magnesium stearate, petroleum jelly or the like. They can be administered in conventional pharmaceutical forms, for example, solid forms such as capsules, tablets, suppositories or liquid forms such as, solutions and emulsions.

The following examples are illustrative but not limitative of the present invention.

EXAMPLE 1

Cells of *Pseudomonas aeruginosa* ATCC-7700 were inoculated into 6 liter Erlenmeyer flasks containing 2 liters of the inoculum medium composed of (in g/liter): Bacto-peptone. (The product resulting from digestion of proteinaceous material meat casing or gelatin) (Difco), 6.0; N-Z Amine type A (pancreatic hydrolysate of casein), 4.0; yeast autolyzate (National Yeast Products), 3.0; beef extract (Wilson), 1.5; and glucose, 1.0. The flasks were incubated at 28° for 72 hours on a rotary shaker (240 rpm with a 2 inch stroke). Four liters of inoculum was then added to 1,320 liters of fermentation medium containing (in g/liter): Cerelose (crude glucose)(Corn Products), 11.0; Bacto-yeast extract (water soluble of autolyzed yeast)(Difco), 2.0; asparagine, 0.5; and $K_2HPO_4$, 0.5. The culture was incubated at 30° in a 1,900 liter fermentor, aerated at 565 lpm and agitated at 150 rpm. Silicone antifoam (Dow Corning AF) was added as needed to control frothing. After 42 hr the fermentation broth was clarified by Sharples centrifugation.

ISOLATION PROCEDURE

The clarified broth was treated at pH 7.0 with 20 g/liter of charcoal (Darco G-60). After filtration through celite, the filtrate was concentrated under reduced pressure to one-tenth its original volume. Five volumes of acetone was added to the concentrate. After standing for 24 hours at 4°C., the suspension was filtered with the aid of celite and the filtrate concentrated and lyophilized.

A column (6 cm diameter) was filled to a height of 60 cm with 2 liters AG 1X8 (200–400 mesh anion exchange resin, chloride form). The resin was converted to the bicarbonate form by passing 6 liters of 3.7M $KHCO_3$ through the column. A charge of 25 g. of the so-obtained lyophilized powder dissolved in 200 ml. distilled water and adjusted to pH 10.0 with 10% sodium hydroxide solution was then applied to the resin and the resin was eluted with 0.05 M trimethylammonium bicarbonate solution, pH 9.5, prepared by sparging $CO_2$ into 25% aqueous trimethylamine solution followed by appropriate dilution. Fractions containing activity greater than 20 mcg/ml., occurring at an elution volume of 4 liters to 9 liters, were evaporated at reduced pressure to an oil. The oil was taken up in 7 ml. hot methanol and after storage for 48 hours at 0° crystals of L-2-amino- 4-methoxy-trans-3-butenoic acid were removed by filtration. After recrystallization from 80 percent aqueous ethanol, the product was obtained, m.p. 240°–245° (dec); ir 1620 (carboxylate C = 0), 1665 and 1220 cm$^{-1}$ (O—C=C); nmr (15 mg ext TMS), $\delta$ 7.25 ($d$, 1, J = 13 Hz, O—CH=C), 5.38 ($d$ of $d$, 1, J = 10 and 13 Hz, —CH=CH—C), 4.70 ($d$, 1, J = 10 Hz, CH—CH—NH$_2$), 4.24 (s, 3, CH$_3$—O); mass spectrum m/e 86 (only major peak); pKa$_1$, 2.47, pKa$_2$, 9.55; $[\alpha]_D^{25}$ + 115 ($c$ = 1, H$_2$O); ord (c = 0.13, 1N HCl) $[\phi]_{700}$ = +148, $[\phi]_{589}$ = +192, $[\phi]_{233}$ = +16,800 (peak), $[\phi]_{244}$ = 0, $[\phi]_{215}$ = −30,300.

Anal. calcd for $C_5H_9NO_3$: C, 45.71; H, 6.92; N, 10.68; OHC$_3$, 23.66. Found: C, 45.96; H, 6.94; N, 10.58; OCH$_3$, 22.66.

EXAMPLE 2

A six inch diameter column was filled to a height of 90 cm with 25 liters Dowex 1X4 resin, (50–100 mesh, chloride form) and 100 gal. of 5 percent NaHCO$_3$ solution was passed through the column to convert the resin to the bicarbonate form. After washing with 100 gal. of 0.1 percent aqueous ammonia solution and backwashing with distilled water, the resin was charged with 500 g. of lyophilized powder as obtained in Example 1 dissolved in 6 liters distilled water adjusted to pH = 9.5 with 25 percent aqueous trimethylamine solution. The resin was then eluted with 0.05 M trimethylammonium bicarbonate solution (prepared as above). Fractions containing greater than 15 mcg/ml activity were combined in early and late pools of elution volumes, 100–150 liters and 150–200 liters respectively. The L-2-amino-4-methoxy-trans-3-butenoic acid in the latter, about 30 percent pure on a non-volatile solids basis, could be crystallized from methanol in up to 60 percent yield but the mother liquors from this and the crude concentrate from the early pool required further purification on a small anion exchange column as described above.

EXAMPLE 3

Parental Formulation

| Each 1 cc ampul contains: | Per cc |
|---|---|
| L-2-Amino-4-methoxy-trans-3-butenoic acid | 5.1 mg |
| Benzyl Alcohol | 0.1 cc |
| Water for Injection, U.S.P. q.s. ad | 1 cc |

PROCEDURE (FOR 10,000 CC)

1. In a clean glass or glass-lined vessel, 8,000 cc of Water for Injection were heated to 90°C. It was then cooled to 50°–60°C., and benzyl alcohol was added and dissolved with stirring. The solution was then allowed to cool to room temperature.
2. The 51.0 grams of L-2-Amino-4-methoxy-trans-3-butenoic acid were added under an atmosphere of nitrogen and stirred until completely dissolved.
3. Sufficient Water for Injection was then added to make a total volume of 10,000 cc.
4. This solution was then filtered through an 02 Selas candle, filled into suitable size ampuls, gassed with nitrogen and sealed.

EXAMPLE 4

5.0% Cream

| | Mg. Per Gram |
|---|---|
| L-2-Amino-4-methoxy-trans-3-butenoic acid | 50.00 |
| Stearyl Alcohol | 100.00 |
| Cetyl Alcohol | 15.00 |
| White Petrolatum | 70.00 |
| Methyl Parahydroxybenzoate, U.S.P. | 2.00 |
| Propyl Parahydroxybenzoate, U.S.P. | 0.50 |
| Isopropyl Palmitate | 60.00 |
| Polyoxyl 40 Stearate, U.S.P. | 40.00 |
| Propylene Glycol | 120.00 |
| Disodium Versenate | 0.10 |
| Distilled Water | 548.16 |

PROCEDURE

1. The stearyl alcohol, cetyl alcohol, petrolatum, propyl parahydroxybenzoate, isopropyl palmitate and polyoxyl 40 stearate were melted at 75°C. The mixture was cooled to and maintained at 70°C.
2. Disodium versenate and methyl parahydroxybenzoate were dissolved in hot distilled water to which was added the propylene glycol. The solution was mixed at 75°C. and slowly added to the oil solution prepared previously, using slow agitation. The emulsion was gradually cooled with slow stirring.
3. When the temperature of the ointment reached 55°C., a solution of L-2-Amino-4-methoxy-trans-3-butenoic acid was added and mixed with the ointment.
4. When the temperature of the ointment reached 50°C., cold water was circulated in the jacket of the kettle and the ointment was cooled to 30°C. with stirring. The ointment was then transferred to storage containers.

EXAMPLE 5

Tablet Formulation

| | Per Tablet |
|---|---|
| L-2-Amino-4-methoxy-trans-3-butenoic acid | 100 mg |
| Lactose, U.S.P. | 202 mg |
| Corn Starch, U.S.P. | 80 mg |
| Amijel BO11* | 20 mg |
| Calcium Stearate | 8 mg |
| Total Weight | 401 mg |

*A prehydrolyzed food grade corn starch. Any similar prehydrolyzed corn starch may be used. Purchased from: Corn Products Company, 10 East 56th Street, New York, New York

PROCEDURE

1. L-2-Amino-4-methoxy-trans-3-butenoic acid, lactose, corn starch, and Amijel BO11 were blended in a suitable mixer.
2. The mixture was granulated to a heavy paste with water and the moist mass was passed through a No. 12 screen. It was then dried overnight at 110°F.

3. The dried granules were passed through a No. 16 screen and transferred to a suitable mixer. The calcium stearate was added and mixed until uniform.

4. The mixture was compressed at a tablet weight of 410 mg using tablet punches having a diameter of approximately ⅜ inch. (Tablets may be either flat or biconvex and may be scored if desired.)

EXAMPLE 6

Capsule Formulation

|  | Per Capsule |
|---|---|
| L-2-Amino-4-methoxy-trans-3-butenoic acid | 10 mg |
| Lactose, U.S.P. | 165 mg |
| Corn Starch, U.S.P. | 30 mg |
| Talc, U.S.P. | 5 mg |
| Total Weight | 210 mg |

PROCEDURE

1. L-2-Amino-4-methoxy-trans-3-butenoic acid, lactose and corn starch were mixed in a suitable mixer.
2. The mixture was further blended by passing through a Fitzpatrick Comminuting Machine with a No. 1A screen with knives forward.
3. The blended powder was returned to the mixer, the talc added and blended thoroughly.
4. The mixture was filled into No. 4 hard shell gelatin capsules on a Parke Davis capsulating machine. (Any similar type capsulating machine may be used.)

We claim:

1. A process for preparing a compound of the formula

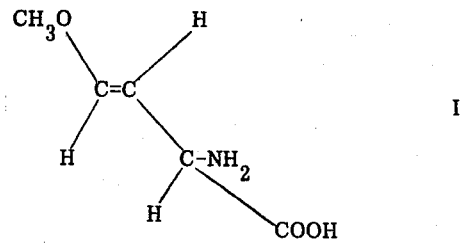

I which comprises fermenting the microorganism *Pseudomonas aeruginosa* ATCC 7700 under submerged aerobic conditions to obtain the compound of the formula I and thereafter isolating said compound from the fermentation broth.

* * * * *